US00RE40827E

(19) United States
(12) Reissued Patent
Butler et al.

(10) Patent Number: US RE40,827 E
(45) Date of Reissued Patent: Jul. 7, 2009

(54) TWO-PORT ETHERNET LINE EXTENDER

(75) Inventors: Kent A. Butler, Cedar Valley, UT (US); Alma K. Schurig, Orem, UT (US)

(73) Assignee: Brookline Flolmstead LLC, Las Vegas, NV (US)

(21) Appl. No.: 11/441,466

(22) Filed: May 25, 2006

Related U.S. Patent Documents

Reissue of:
(64) Patent No.: 6,741,612
Issued: May 25, 2004
Appl. No.: 10/093,086
Filed: Mar. 5, 2002

(51) Int. Cl.
*H04J 3/08* (2006.01)

(52) U.S. Cl. ..... 370/501; 370/293; 370/463; 370/502

(58) Field of Classification Search ..... None
See application file for complete search history.

(56) References Cited

U.S. PATENT DOCUMENTS 5,875,210 A * 2/1999 Brief et al. ..... 375/211
5,923,663 A * 7/1999 Bontemps et al. ..... 370/445
6,272,552 B1 * 8/2001 Melvin et al. ..... 709/250
6,328,480 B1 * 12/2001 Strike ..... 385/75
6,377,640 B2 * 4/2002 Trans ..... 375/354
6,430,695 B1 * 8/2002 Bray et al. ..... 713/501
6,452,927 B1 * 9/2002 Rich ..... 370/395.1
6,483,849 B1 * 11/2002 Bray et al. ..... 370/465
6,516,352 B1 * 2/2003 Booth et al. ..... 370/463
6,556,589 B2 * 4/2003 McRobert et al. ..... 370/501
6,718,419 B1 * 4/2004 Delvaux ..... 710/305
6,914,884 B2 * 7/2005 Matsuo et al. ..... 370/249
7,092,362 B1 * 8/2006 Demakakos et al. ..... 370/249
2002/0019954 A1 * 2/2002 Tan ..... 713/600

OTHER PUBLICATIONS

"IEEE P802.3af–DTE Power via MDI Task Force"; Website; URL:http://www.ieee802.org/3/af/; Last Update: Sep 12, 03.
"Objectives for DTE Power Study Group"; as approved by DTE Power via MDI SG; Nov. 10, 1999.
"Network Transient Protection Devices: Raychem SiBar Thyristors Surge Protection Devices"; Website; http://www.circuitprotection.com/sibar.asp.
"Teccor SIDACtor Manual"; Manuali Teccor Electronics Inc.
"Fundamentals of SiBar Thyristor Overvoltage Devices"; Raychem Circuit Protection: SiBar Thyristor Surge Protection; Tyco Electronics; 2004.
Hartwig, Bruce; "What Is A Silicon Transient Voltage Suppressor and How Does it Work?"; Application Note; Vishay Semiconductor (Formerly General Semiconductor); Mar. 1, 2004.

(Continued)

*Primary Examiner*—Phirin Sam

(57) ABSTRACT

An apparatus for deployment in an outdoor environment for extending the electrical communication distance of digital data signals includes electrical isolation means for various electromagnetic effects and a high speed pulse reshaper and repeater. The isolation means includes low capacitance electric pulse suppression means so that maximum signal distance can be achieved without loss of usable pulse shape and isolation transformers on differential signal pairs that retain magnetization at elevated temperatures so that signals are not blocked. As a further feature, extended logic is included whereby the type of signals can be distinguished, thus allowing the apparatus to be daisy-chained with like apparatus or used between a termination and a line.

40 Claims, 2 Drawing Sheets

OTHER PUBLICATIONS

"1500W Transient Voltage Suppressor"; Data Sheet; Diodes Incorporated.

IEEE 802.3 DTE Power via MDI Study Group–Jan. 2000 Interim meeting, Jan. 20–21, 2000, Dallas, TX; Website; http://www.iee802.org/3/power __study/publicjan00/index.html.

"100TX Termination"; Email; http://www.iee802.org; Aug. 5, 1999.

Nootbaar, Michael; "DTE Power over MDI: BER vs. Transformer Current"; TDK Semiconductor Corp.; Jan. 19–20, 2000; http://www.iee802.org/3/power__study/public/jan00/nootbaar__1__0100.pdf.

Leonowich, Robert and Donald Stewart; "Power Delivery Mechanisms"; Lucent Technologies: Bell Labs Innovations; Jan. 18, 2000; IEEE 802.3 DTE Power via MDI Study Group–Jan. 2000 Interim meeting, Jan. 20–21, 2000, Dallas, TX; http://www.iee802.org/3/power__study/public/jan00/leonowich__1__0100.pdf.

Frazier, Howard, Karl Nakamura and Roger Karam; "Power over the MDI"; Cisco Systems; Jan. 20–21, 2000; http://www.iee802.org/3/power__study/public/jan00/frazier__1__0100.pdf.

"Ethernet Extender Information on GlobalSpec"; Search Results; GlobalSpec; http://search.globalspec.com/Search?query=Ethernet%20Extender&show=total.

"Ethernet Extenders"; Patton Electronics Co.; http://www.patton.com/products/pe__products.asp?Category=146.

"Ethernet Extenders"; RADirect, Inc.; http://www.rad–direct.com/AppFam–Ethernet–extenders.htm?source=google?. WT mc__r=360&WT. srch=1&WT. mc__n=Google–RADirect__Priority&WT. mc__t=LAN%20EXTENSION.

"4–Port Gigabit Ethernet and 1/2G Fibre Channel Repeater or Retimer"; Data Sheet; PMC–Sierra, Inc.; 2003; www.pmc–sierra.com/cgi–bin/download__p.pl?res__id=7087&filename=2030741__007087.pdf.

"Network Repeaters Information on GlobalSpec"; Search Results; GlobalSpec; http://network–equipment. globalspec.com/LearnMore/Communications__Networking/Networking__Equipment/Network __Repeaters.

"Quad RMII 10Base–T/100Base–TX/FX Ethernet Transceiver"; Data Sheet; Altima Communications, Inc. A Wholly Owned Subsidiary of Broadcom Corporation; Sep. 22, 2003.

"Comparison Between the AC104X and AC104"; Application Note; Altima Communications, Inc. A Wholly Owned Subsidiary of Broadcom Corporation; Jan. 2, 2002.

"BCM5402 Dual–Port 10/100/1000Base–T Gigabit Copper Transceiver"; Product Brief; Broadcom Corporation; 2003.

* cited by examiner

TWO-PORT ETHERNET LINE EXTENDER

Matter enclosed in heavy brackets [ ] appears in the original patent but forms no part of this reissue specification; matter printed in italics indicates the additions made by reissue.

CROSS-REFERENCES TO RELATED APPLICATIONS

Not Applicable

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK

Not Applicable

BACKGROUND OF THE INVENTION

This invention relates to digital data communications over distance-limited wire media. In particular, this invention relates to an apparatus for extending the propagation distance of digital data signals.

There is a need to provide means to extend the effective distance over which digital data signals are communicated via wire in an outdoor environment. Distances may be greater than be supported by the conventional routers and switches. For example, known implementations of 100 BASE-TX physical layer integrated circuits such as the Broadcom AC104QF (from Broadcom, Inc.) typically handle only up to 150 m (492 ft.) of Category 5 cabling at room temperature for speeds up to 100 MBPS. Moreover, power consumption becomes a serious concern because power must be supplied and distributed by the outdoor network. Alternative schemes such as optical fiber are not cost effective for all applications, particularly over relatively short distances of several hundred meters.

A standard has been adopted for electrical and magnetic isolation of electronic circuitry intended to be operated in a severe outdoor environment. The standard is referenced as IEEE 802.3u, IEEE 802.3ab and ANSI X3.236. The specifications provide for operation in a temperature range between 0 and 70 Celsius. For extended operation between −40 C and +85 C, which is more typical of actual experience in some environments, adoption of this standard would be inadequate for reliable operation. Because Category 5 cabling and installation are less expensive than the fiber optic alternative, it is desirable to be able to go farther than the 100 m (328) feet required by the IEEE standard using a low cost cable extender that is powered from the upstream network cable.

SUMMARY OF THE INVENTION

According to the invention, an apparatus is provided for deployment in an outdoor environment for extending the electrical communication distance of digital data signals. The apparatus includes electrical isolation means for various electromagnetic effects and a high speed pulse reshaper and repeater. The isolation means includes low capacitance electric pulse suppression means so that maximum signal distance can be achieved without loss of usable pulse shape and isolation transformers on differential signal pairs that retain magnetization at elevated temperatures so that signals are not blocked. As a further feature, extended logic is included whereby the type of signals can be distinguished for speed and duplex settings, thus allowing the apparatus to be daisy-chained with like apparatus or used between a termination and a line.

A network interface data rate and half/full duplex mode may differ from that of the network. Different devices are capable of different speeds and some are capable of only one speed. The speed and duplex mode of the lowest common denominator must be extended to the network switch port to avoid communications breakdown.

The invention will be better understood upon reference to the following detailed description in connection with the accompanying drawings.

DETAILED DESCRIPTION OF THE INVENTION

Figure 1:
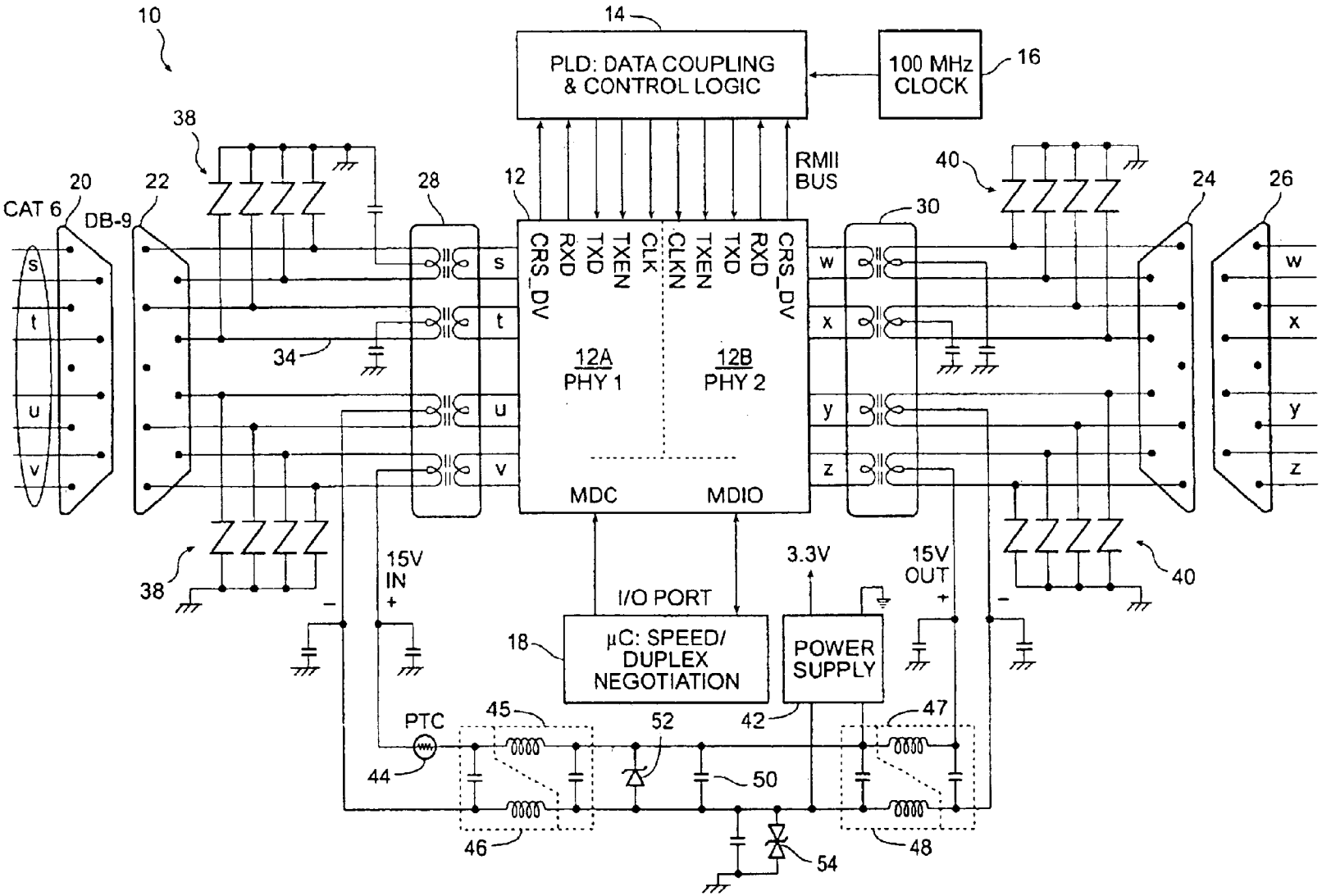
FIG. 1 is a block diagram of an apparatus according to the invention.

FIG. 1 is a block diagram of a line extender 10 according to the invention. The line extender 10 is built around a two port pulse shaping and repeating circuit set (PHY 1) 12A and (PHY 2) 12B for shaping and repeating pulses. This circuit set 12 is an integrated circuit combining sets of low-power physical layer transceiver and protocol control devices.

A specific embodiment for use in a 10/100 MBPS application is a Model AC104QF PHY quad (four element) device manufactured by Broadcom, Inc. of Irvine, Calif. This circuit is compliant with specific standards, namely the IEEE 802.3u specification and the RMII (Reduced Media Independent Interface) specification. The 10/100 MBPS PHY typically uses two unshielded twisted pairs for each transmission port, one pair dedicated to transmit signals (pairs t and w) and a second pair to receive signals (pairs s and x). The other two pairs (u/v and y/z) may be unused for data or they may be used to extend a second 10/100 MBPS line connection and are operated according to the invention for transmission of power. For the three speeds of 10/100 M and 1 Gigabit per second, higher speed PHYs may be used which employ more dedicated channels and wherein each pair of wires is used for both transmit and receive, according to IEEE 802.3ab. In such a case pairs s/t and u/v service one PHY 12A and pairs w/x, y/z service the other PHY 12B. Examples of suitable components are Broadcom Model BCM5402 and Marvel 88E1020 (Sunnyvale, Calif.). The PHY circuit set 12 normally interfaces to a switch or (RS) (Reconciliation Sublayer) of a MAC (media access controller) on one side (not shown) and the hard wired or copper interface on the other side (not shown).

To transmit data, the PHY circuit set 12 converts the digital data stream on the RS side to the appropriate signaling needed to launch the data on the copper cabling. To receive data, the PHY circuit set 12 converts the signals it receives into a digital data stream which is passed up. The RX ports and the TX ports of the PHYs are protected through isolation mechanisms from the outside environment. 10/100 RXD and TXD ports provide interface to internal devices through either an RMII bus or an MII bus (or a RGMII or GMII bus for 1000 BaseT PHY devices).

The line extender 10 employs as a controller for the PHY 12A and 12B a single programmable logic device (PLD) 14 for coupling, timing and logic control. The PLD 14 provides two specific functions. First, it provides the derivation of two 50 MHz clock signals needed in an oscillator section. Second, it provides the control so that two PHYs 12A, 12B can be connected together such that data can be passed between them. A suitable PLD is a Xilinx Coolrunner XCR3032XL-7 VQ441 or an Altera 7032.

A direct connection between two PHYs 12A, 12B cannot be made because the established specification does not provide for access that can be handled easily. In particular, the IEEE 802.3 specification clause 22 describes the interface between the RS and a PHY called the MII (Media Independent Interface) specification. It also describes Station Management which allows access to the registers of each PHY port on the IC. However, the MII specification dictates 16 pins per port, seven for transmitting data and nine for receiving data. For a true four-port PHY, this would be 64 pins merely for interface to the RS. To reduce the pin count and subsequently the cost of the PHY function, a new specification was developed by the RMII Consortium. This subsequent specification is called the RMII Specification. A mapping of MII to RMII has been specified. However, because the functionality of certain pins is combined, it is necessary for the PLD 14 to monitor received signals in order to identify the beginning and end of packets to effect assertion and de-sertion of transmit enable signals at the correct bit times.

A 100 MHz oscillator 16 is coupled to the PLD 14 and used to generate two 50 MHz clocks, CLK (REFCLK) and CLKN (REFCLKN) which are 180 degrees out of phase from each other. These two clocks are both used in the internal logic of the PLD 14. CLK is also used to provide the PHY 12 with a 50 MHz clock. Since both CLK and CLKN are generated from the rising edge of the 100 MHz clock, concerns over the duty cycle of the oscillator and associated jitter, setup and hold times are avoided.

When the line extender 10 is to be deployed in where it must deal with arbitrary types of signals, a mechanism is needed to recognize and respond to assure compatibility between signal sources and signal destination. To this end, a microcontroller 18 is provided which is coupled to the PHY circuit set 12 so it can read the status and set up speed and mode of each PHY element. Its function is primarily to match the speed and duplex setting of the uplink port to the speed and duplex setting of the downlink port. This is done in the 100 BaseT embodiment so that a customer can connect to an Ethernet device that is not 100 MBPS full duplex. The microcontroller 18 used is for example an Atmel AT90LS2343. Nevertheless, a microcontroller is not needed in a line extender used in an environment in which it does not need to autonegotiate speed and mode.

A standard has been adopted for electrical and magnetic isolation of electronic circuitry intended to be operated in a severe outdoor environment. The standard is referenced as IEEE 802.3u, IEEE 802.3ab and ANSI X3.236. The specifications provide for operation in a temperature range between 0 and 70 C. For extended operation between −40 C and +85 C, which is more typical of actual experience in some environments, as well as the extremes of current and of voltage transients, construction of devices merely compliant with this standard is inadequate for reliable operation.

Accordingly, the extender 10 of the invention incorporates a number of features that go beyond standards compliance. Connectors 22, 24 used on the extender 10 are dual (stacked) right angle female DB-9 connectors that mate with DB-9 connectors 20, 26. This type of connector is an industry standard but it is not known to have been used commercially for Ethernet signals. However, its pins provide 360 degree surface area coverage, and mating connectors provide 360 surface coverage for the pin area and are connected through solid mechanical connections and held together with two screws. The signal connectors would normally be expected to be of type RJ-45. However, such connectors are not as robust or as reliable for the intended use as the chosen connectors.

In order to provide the needed electrical isolation, isolation elements 28 and 30 with an extended temperature rating are used for voltage isolation and EMI suppression. The isolation elements 28 and 30 typically provide one isolation transformer per twisted pair or 2–4 isolation transformers per port (as illustrated) in addition to common mode and EMI suppression chokes/filters and line impedance resistors (not illustrated.) Isolation elements 28 and 30 may be incorporated into a single, dual or quad port isolation module Shunted across each of the wiring connections 34 and 36 to ground between the connectors 22 and 24 and the isolation elements are for example SiBar (a brand of Raychem Corporation of Menlo Park, Calif.) (Model TVB170) or SIDACtor (a brand of Teccor of Irving, Tex.) (Model P2604UA) bi-directional overvoltage suppression devices. They suppress voltages above a certain threshold, typically around +/−170 V. This voltage protection is intended to protect the extender 10 from damage or destruction by indirect lightning strikes or other causes such as power line faults. Care must be taken to select low capacitance suppression devices to permit operation of Ethernet signals over cable distances of 150 m.

A high efficiency power supply 42 using a switching regulator is provided to convert power received from upstream (15–22 VDC). The power is filtered and isolated. The power supply provides the voltage needed to power the PHY, namely 3.3 VDC, and to the other active devices. An auto resettable fuse 44 is used to stop current flow when it becomes too high. This provides short circuit protection. When excessive current flows through the fuse, the characteristics of the material change from low impedance to high impedance causing the current flow to cease. The fuse stays in this state until the power is turned off and the fuse has cooled down enough that the material changes back to a low impedance. This permits remote reset of the fuse by momentarily turning off network power. The ambient temperature has an effect on the threshold at which the fuse takes on the high impedance state. The higher the temperature, the lower the amount of current required to cause the fuse to go into a high impedance state.

EMI filters 45–48 are placed in the ground and positive lines of the power source lines from both connectors. The EMI filters 45–48 together with associated shunt capacitors suppress both voltage and current anomalies. In addition, there is both a differential transient voltage filter capacitor 50 built around a single Zener diode or TVS 52 (transient voltage suppressor) placed between the positive voltage and ground return line and a common mode transient voltage protector 54 built around a double Zener diode or bi-directional TVS placed between the ground return line and the chassis ground. In this manner, the extender 10 is effectively isolated from both unwanted common mode and differential transients.

Figure 2:
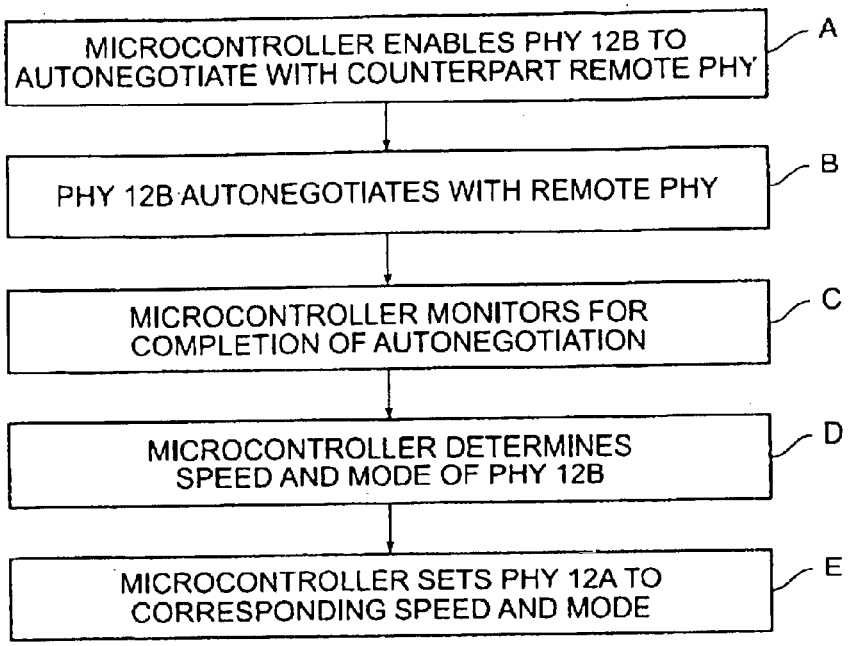
FIG. 2 is a flow chart of operation of a microcontroller according to the invention.

FIG. 2 is a simplified flow chart explaining the operation of the PHY circuit set 12. The PLD 14 talks directly to each PHY 12A, 12B, typically through a Reduced Media Independent Interface (RMII) bus, and it stands alone as a logic device to send two bits (for RMII bus) at a time for an effective 100 MBPS to 1* GBPS data transfer rate. It responds to the speed settings of the PHYs and transfers data between PHYs at the preset speed. The PHYs incorporate RMII to MII translation where the PHYs employ RMII interface. The microcontroller 18 acts as an extended arbitration logic element to enable auto negotiation of data speed and set duplex mode for the addressed PHY. Where the PHY 12B controls the customer downlink port B, the microcontroller 18 enables the PHY 12B to autonegotiation with a neighboring PHY (not shown) at a counterpart port remote from the extender 10 (Step A). The PHY 12B then autonegotiates speed and duplex mode with the neighboring PHY (Step B). The autonegotiation protocol is conventional.

The microcontroller 18 then monitors the status register of PHY 12B to verify that autonegotiation has been completed or has timed out (Step C). The microcontroller 18 then reads status registers of the PHY 12B to determine the speed and mode of the PHY 12B (Step D). Thereupon, the microcontroller 18 writes the matching speed and mode to the control registers of the linking PHY 12A to match the speed and mode of PHY 12A with PHY 12B (Step E). A PHY (not shown) at the remote uplink port off of connector 20 is typically set to its own autonegotiation mode in order to match with the speed and mode of the line extender 10. In this manner the line extender 10 can be daisy chained as it becomes transparent to the downlink port and the uplink port.

Figure 3:
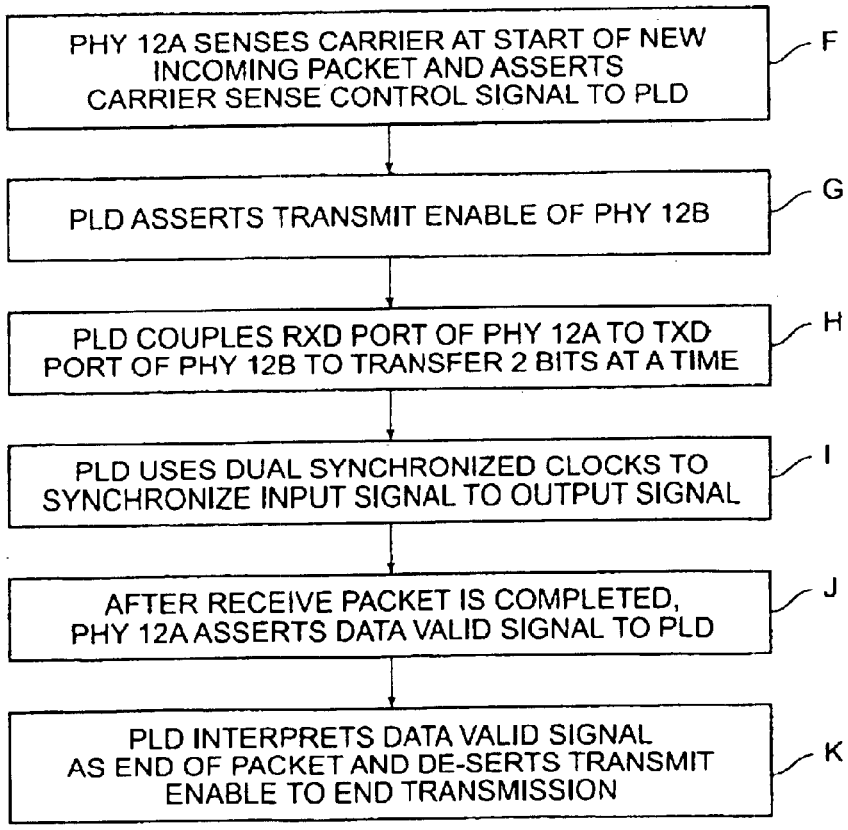
FIG. 3 is a flow chart of operation of a programmed logic element according to the invention.

FIG. 3 illustrates the basic operation of the PLD 14 according to the invention. Two directions of flow control are carried out in duplex; uplink to downlink and downlink to uplink. Only one direction is explained. It will be assumed that the direction is uplink to downlink. PHY 12A acting as a receive PHY senses carrier at the start of a new incoming packet and asserts a Carrier Sense (CRS) control signal to the PLD 18 which identifies it with PHY 12A (Step F). Upon reading the CRS signal, the PLD 14 enables the transmitter of PHY 12B (Step G). Thereupon, the PLD 14 couples the RXD port of PHY 12A to the TXD port of PHY 12B, transferring data two bits at a time (Step H). Not shown is a translation in the PHYs of MII to RMII and RMII to MII.

The PLD 14 employs dual synchronized clocks to synchronize input data and output data (Step I). When the receive packet is completed, PHY 12A drops the assertion of carrier sense (CRS) signal and asserts a data valid (DV) signal to the PLD 14 (Step J). Since the state is known, the DV signal and the CRS signal can share the same pin. The PLD 14 interprets the DV signal and de-serts the Transmit Enable signal of PHY 12B, ending the transmission with the end of the packet (Step K).

The microcontroller makes sure that the signals appear to each other to be homogeneous. The PLD 14 furnishes the control and facilitates the data transfer in real time.

The invention has been explained with reference to specific embodiments. For example, the 100 BaseT RMII PHY has been illustrated because it particularly requires the use of the present invention for implementation. Other embodiments will be evident to those of ordinary skill in the art. It is therefore not intended that this invention be limited, except as indicated by the appended claims.

What is claimed is:

1. An apparatus for extending propagation distance of digital data signals over distance-limited wire media comprising:

a first multiple-pin connector configured to carry first input signals in a first differential pair, to carry first output signals in a second differential pair, and to carry power;

a second multiple-pin connector configured to carry second input signals in a third differential pair, to carry second output signals in a fourth differential pair, and to carry power;

a power line between the first connector and the second connector;

a ground line between the first connector and the second connector;

electromagnetic chokes adjacent ingress locations in the power line;

electromagnetic chokes adjacent ingress locations in the ground line;

transient voltage protection means between the power line and the ground line operative to filter both common mode transient voltage and differential transient voltage in order to isolate said apparatus from unwanted transients;

a low-capacitance electric pulse suppression means operative to suppress both voltages and current anomalies in order to achieve maximum distance of signal in usable pulse shape, between each element of said first, second, third and fourth differential pairs and ground adjacent each said first and second connector;

a first pulse shaping and repeating circuit for shaping and repeating pulses of said input signals received and for transmitting said output signals;

a second pulse shaping and repeating circuit for shaping and repeating pulses of said input signals received and for transmitting said output signals;

first isolation transformers coupled between said first connector and said first pulse shaping circuit for common mode transient and voltage isolation and for electromagnetic interference filtering of said first differential pair and said second differential pair from said *first* pulse shaping circuit, said *first* isolation transformers being capable of maintaining magnetizing inductance at elevated temperatures;

second isolation transformers coupled between said second connector and said second pulse shaping circuit for common mode transient and voltage isolation and for electromagnetic interference filtering of said third differential pair and said fourth differential pair from said *second* pulse shaping circuit, said *second* isolation transformers being capable of maintaining magnetizing inductance at elevated temperatures;

a programmed logic device coupled to said first and second pulse shaping circuits for coupling input signals originating from the first connector directed to the second connector and for coupling input signals originating from the second connector directed to the first connector; and a microcontroller coupled to said pulse shaping and repeating circuit for distinguishing and controlling between types of input signals and output signals, and for managing control signals for compatibility.

2. The apparatus according to claim 1 wherein said microcontroller comprises means operative to distinguish between full duplex and half duplex as well as to sense speed.

3. The apparatus according to claim 1 wherein said pulse shaping and repeating circuits are coupled to said programmed logic [element] *device* through a reduced media independent interface bus.

4. The apparatus according to claim 1 wherein said pulse shaping and repeating circuits are each a low-power physical layer transceiver and protocol control device.

5. An apparatus for bidirectional distribution of packet-switched digital data signals over distance-limited wire media in an outdoor environment comprising:

a first multiple-pin connector configured to carry first input signals in a first differential pair and in a fifth differential pair, to carry first output signals in a second differential pair and in a sixth differential pair, and to carry power;

a second multiple-pin connector configured to carry second input signals in a third differential pair and in a seventh differential pair, to carry second output signals in a fourth differential pair and in an eighth differential pair, and to carry power;

a power line;

a ground line;

electromagnetic chokes adjacent ingress locations in the power line;

electromagnetic chokes adjacent ingress locations in the ground line;

transient voltage protection means between the power line and the ground line operative to filter both common mode transient voltage and differential transient voltage in order to isolate said apparatus from unwanted transients;

a low-capacitance electric pulse suppression means operative to suppress both voltages and current anomalies in order to achieve maximum distance of signal in usable pulse shape, between each element of said first, second, third and fourth differential pairs and ground adjacent each said first and second connector;

a first pulse shaping and repeating circuit for shaping and repeating pulses of said input signals received and for transmitting said output signals;

a second pulse shaping and repeating circuit for shaping and repeating pulses of said input signals received and for transmitting said output signals;

first isolation transformers coupled between said first connector and said first pulse shaping circuit for common mode transient and voltage isolation and for electromagnetic interference filtering of said differential pairs *of the first connector* from said first pulse shaping circuit, said isolation transformers being capable of maintaining magnetizing inductance at elevated temperatures;

second isolation transformers coupled between said second connector and said second pulse shaping circuit for common mode transient and voltage isolation and for electromagnetic interference filtering of said differential pairs *of the second connector* from said second pulse shaping circuit, said isolation transformers being capable of maintaining magnetizing inductance at elevated temperatures;

a programmed logic device coupled to said first and second pulse shaping circuits for coupling input signals originating from the first connector directed to the second connector and for coupling input signals originating from the second connector directed to the first connector; and a microcontroller coupled to said pulse shaping and repeating [circuit] *circuits* for distinguishing and controlling between types of input signals and output signals, and for managing control signals for compatibility.

*6. A line extender configured to be coupled to a first device and a second device, wherein said line extender is configured to receive first input data on a first pair of lines from said first device and repeat said received first input data onto a second pair of lines for transmission to the second device, and wherein said line extender is configured to receive second input data on a third pair of lines from said second device and repeat said received second input data onto a fourth pair of lines for transmission to the first device, said line extender comprising:*

*a plurality of low-capacitance overvoltage suppression circuits coupled between the lines of the first, second, third and fourth pairs of lines and a ground;*

*a power supply configured to generate a supply voltage for said line extender based upon a potential difference between said first pair of lines and said fourth pair of lines;*

*wherein the line extender is configured to convey power from the first and fourth pairs to the second and third pairs.*

*7. The line extender of claim 6, wherein the second device is network interface device.*

*8. The line extruder of claim 6, wherein the second device is a second line extender.*

*9. The line extender of claim 6, wherein the first device is an Ethernet switch.*

*10. The line extender of claim 6 further comprising:*

*a first electromagnetic choke coupled between the first pair of lines and a first input of the power supply;*

*a second electromagnetic choke coupled between the second pair of lines and a second input of the power supply.*

*11. The line extender of claim 6 further comprising:*

*a first line coupling the first pair of lines to the power supply;*

*a second line coupling the fourth pair of lines to the power supply;*

*a transient voltage protection suppressor coupled between the first and second lines.*

*12. The line extender of claim 6 further comprising:*

*first circuitry configured to:*

*receive the first input data on the first pair of lines from said first device,*

*repeat said received first input data onto the second pair of lines for transmission to the second device,*

*receive the second input data on the third pair of lines from said second device,*

*repeat said received second input data onto the fourth pair of lines for transmission to the first device.*

*13. The line extender of claim 12, wherein the first circuitry includes:*

*a first pulse shaping and repeating circuit coupled to the first and fourth pairs;*

*a second pulse shaping and repeating circuit coupled to the second and third pairs;*

*a programmable logic device coupling between the first and second pulse shaping and repeating circuits, wherein the programmable logic device is configured to forward the first input data from the first pulse shaping and repeating circuit to the second pulse shaping and repeating circuit and to forward the second input data from the second pulse shaping and repeating circuit to the first pulse shaping and repeating circuit.*

*14. The line extender of claim 13, wherein the first circuitry also includes:*

*a first set of isolation transformers coupled to the first and fourth pairs and to the first pulse shaping and repeating*

*circuit, said first set of isolation transformers being configured to maintain magnetizing inductance at elevated temperatures;*

*a second set of isolation transformers coupled to the second and third pairs and to the second pule shaping and repeating circuit, said second set of isolation transformers being configured to maintain magnetizing inductance at elevated temperatures.*

*15. The line extender of claim 12 further comprising:*

*a microcontroller coupled to first circuitry for controlling rate and mode negotiation between the line extender and the first device and the between the line extender and the second device.*

*16. The line extender of claim 6 further comprising:*

*a first line coupling between the first pair of lines and the second pair of lines;*

*a second line coupling between the third pair of lines and the fourth pair of lines; and*

*wherein said power is conveyed through the first line and second line.*

*17. The line extender of claim 16, wherein the first line couples to the first pair of lines so as to receive a first common mode voltage of the first pair of lines, wherein the second line couples to the fourth pair of lines so as to receive a second common mode voltage of the fourth pair of lines, wherein the first potential difference is a difference between the first common mode voltage and the second common mode voltage.*

*18. The line extender of claim 16 further comprising:*

*a bidirectional transient voltage suppressor coupled between the first line and said ground.*

*19. The line extender of claim 6 wherein the potential difference between said first pair of lines and said fourth pair of lines is a difference between a first common mode voltage of the first pair of lines and a second common mode voltage of the fourth pair of lines, wherein the first, second, third and fourth pairs of lines are differential pairs.*

*20. An apparatus, comprising:*

*a first connector configured to carry first input data on a first differential pair of lines and to carry first output data on a second differential pair of lines;*

*a second connector configured to carry second input data on a third differential pair of lines and to carry second output data on a fourth differential pair of lines;*

*a plurality of low-capacitance electric pulse suppression devices coupled between ground and the lines of the first, second, third and fourth differential pairs;*

*a first pulse shaping and repeating circuit;*

*a second pulse shaping and repeating circuit;*

*a first set of isolation transformers coupled between said first pulse shaping and repeating circuit and said first and second differential pairs, wherein said first set of isolation transformers is configured to maintain magnetizing inductance at elevated temperatures;*

*a second set of isolation transformers coupled between said second pulse shaping and repeating circuit and said third and fourth differential pairs, wherein said second set of isolation transformers is configured to maintain magnetizing inductance at elevated temperatures;*

*a programmable logic device coupling between the first pulse shaping and repeating circuit and the second pulse shaping and repeating circuit, wherein the programmable logic device is configured to (a) receive the first input data from the first pulse shaping and repeating circuit and to forward the first input data as the second output data to the second pulse shaping and repeating circuit and (b) receive the second input data from the second pulse shaping and repeating circuit and forward the second input data as the first output data to the first pulse shaping and repeating circuit;*

*first circuitry configured to convey power from the first and second differential pairs to the third and fourth differential pairs, wherein the first circuitry includes:*

*a first circuit path coupled between the first differential pair and the fourth differential pair;*

*a second circuit path coupled between the second differential pair and the third differential pair;*

*a plurality of electromagnetic chokes in the first circuit path and the second circuit path; and*

*a transient voltage protection device coupled between the first circuit path and the second circuit path;*

*a power supply configured to generate a supply voltage for said apparatus based upon a potential difference between said first circuit path and said second circuit path.*

*21. The apparatus of claim 20, further comprising a microcontroller coupled to first pulse shaping and repeating circuit and the second pulse shaping and repeating circuit, wherein the microcontroller is configured for controlling rate and mode negotiation.*

*22. The apparatus of claim 20 further comprising a bidirectional transient voltage suppressor coupled between the second circuit path and said ground.*

*23. The apparatus of claim 20, wherein the first circuit path is coupled to a common mode voltage of the first differential pair and a common mode voltage of the fourth differential pair, wherein the second circuit path is coupled to a common mode voltage of the second differential pair and a common mode voltage of the third differential pair.*

*24. The apparatus of claim 20,*

*wherein the first connector is further configured to carry third input data on a fifth differential pair of lines and to carry third output data on a sixth differential pair of lines;*

*wherein the second connector is further configured to carry fourth input data on a seventh differential pair of lines and to carry fourth output data on an eighth differential pair of lines;*

*wherein the first set of isolation transformers is also coupled to said fifth and sixth differential pairs;*

*wherein the second set of isolation transformers is also coupled to said seventh and eighth differential pairs; and*

*wherein the programmable logic device is further configured to (c) receive the third input data from the first pulse shaping and repeating circuit and to forward the third input data as the fourth output data to the second pulse shaping and repeating circuit and (d) receive the fourth input data from the second pulse shaping and repeating circuit and forward the fourth input data as the third output data to the first pulse shaping and repeating circuit.*

*25. An apparatus, comprising:*

*a first connector configured to carry first input data on a first differential pair of lines and to carry first output data on a second differential pair of lines;*

*a second connector configured to carry second input data on a third differential pair of lines and to carry second output data on a fourth differential pair of lines;*

*a plurality of low-capacitance electric pulse suppression devices coupled between ground and the lines of the first, second, third and fourth differential pairs;*

*a first means for performing pulse shaping and repeating;*

*a second means for achieving electrical isolation between said first means and said first and second differential pairs;*

*a third means for achieving electrical isolation between said first means and said third and fourth differential pairs;*

*a fourth means for (a) receiving the first input data from the first means and forwarding the first input data as the second output data to the first means and (b) receiving the second input data from the first means and forwarding the second input data as the first output data to the first means;*

*a fifth means, coupled to the first means, for controlling rate and mode negotiation;*

*first circuitry configured to convey power from the first and second differential pairs to the third and fourth differential pairs, wherein the first circuitry includes:*

*a first circuit path coupled between the first differential pair and the fourth differential pair;*

*a second circuit path coupled between the second differential pair and the third differential pair;*

*a plurality of electromagnetic chokes in the first circuit path and the second circuit path; and*

*a transient voltage protection device coupled between the first circuit path and the second circuit path; and*

*a power supply configured to generate a supply voltage for said apparatus based upon a potential difference between said first circuit path and said second circuit path.*

*26. The apparatus of claim 25 further comprising a bidirectional transient voltage suppressor coupled between the second circuit path and said ground.*

*27. The apparatus of claim 25, wherein the first circuit path couples to the first differential pair so as to receive a first common mode voltage of the first differential pair, wherein the second circuit path couples to the second differential pair so as to receive a second common mode voltage of the second differential pair, wherein the first potential difference is a difference between the first common mode voltage and the second common mode voltage.*

*28. A neighborhood area network, comprising:*

*a line extender including:*

*a first connector configured to carry first data on a first differential pair of lines and to carry second data on a second differential pair of lines;*

*a second connector configured to carry third data on a third differential pair of lines and to carry fourth data on a fourth differential pair of lines;*

*a plurality of low-capacitance electric pulse suppression devices coupled between ground and the lines of the first, second, third and fourth differential pairs;*

*a first pulse shaping and repeating circuit;*

*a second pulse shaping and repeating circuit;*

*a first set of isolation transformers coupled between said first pulse shaping and repeating circuit and said first and second differential pairs, wherein said first set of isolation transformers is configured to maintain magnetizing inductance at elevated temperatures;*

*a second set of isolation transformers coupled between said second pulse shaping and repeating circuit and said third and fourth differential pairs, wherein said second set of isolation transformers is configured to maintain magnetizing inductance at elevated temperatures;*

*a programmable logic device coupling between the first pulse shaping and repeating circuit and the second pulse shaping and repeating circuit, wherein the programmable logic device is configured to (a) receive the first data from the first pulse shaping and repeating circuit and to forward the first data as the fourth data to the second pulse shaping and repeating circuit and (b) receive the third data from the second pulse shaping and repeating circuit and forward the third data as the second data to the first pulse shaping and repeating circuit;*

*a microcontroller coupled to the first pulse shaping and repeating circuit and the second pulse shaping and repeating circuit, wherein the microcontroller is configured for controlling rate and mode negotiation;*

*first circuitry configured to convey power from the first and second differential pairs to the third and fourth differential pairs, wherein the first circuitry includes:*

*a first circuit path coupled between the first differential pair and the fourth differential pair;*

*a second circuit path coupled between the second differential pair and the third differential pair;*

*a plurality of electromagnetic chokes in the first circuit path and the second circuit path; and*

*a transient voltage protection device coupled between the first circuit path and the second circuit path; and*

*a power supply configured to generate a supply voltage for said line extender based upon a potential difference between said first circuit path and said second circuit path;*

*a first device coupled to the line extender via the first connector and configured to transmit the first data and receive the second data; and*

*a second device coupled to the line extender via the second connector and configured to transmit the third data and receive the fourth data.*

*29. The neighborhood area network of claim 28, wherein the second device is network interface device.*

*30. The neighborhood area network of claim 28, wherein the second device is a second line extender.*

*31. The neighborhood area network of claim 28, wherein the first device is an Ethernet switch.*

*32. A method for extending propagation distance of digital data signals over distance-limited wire media, the method comprising:*

*receiving first signals on a first differential pair of lines and receiving second signals on a second differential pair of lines;*

*operating on the first signals to generate first intermediate signals, wherein said operating provides electrical isolation, including at elevated temperatures;*

*operating on the second signals to generate second intermediate signals, wherein said operating provides electrical isolation, including at elevated temperatures;*

*performing pulse shaping and repeating on the first intermediate signals in order to generate third signals;*

*performing pulse shaping and repeating on the second intermediate signals in order to generate fourth signals;*

*transmitting the third signals on a third differential pair of lines;*

*transmitting the fourth signals on a fourth differential pair of lines;*

*performing rate and mode negotiation with respect to a first external device and a second external device;*

*conveying power from the first and fourth differential pairs to the second and third differential pairs using a first circuit path and a second circuit path, wherein said conveying power includes:*

*performing filtering using electromagnetic chokes along the first circuit path and second circuit path; and*

*providing transient voltage protection between the first circuit path and second circuit path;*

*generating a supply voltage based upon a potential difference between the first differential pair and the fourth differential pair;*

*providing low-capacitance electric pulse suppression for the lines of the first, second, third and fourth differential pairs.*

*33. The method of claim 32, wherein said conveying power also includes providing bidirectional transient voltage suppression for the second circuit path relative to ground.*

*34. The method of claim 32 further comprising: stopping said conveying of power using a resettable fuse.*

*35. An apparatus, comprising:*

*a first connector including first, second, third and fourth differential pairs of lines, wherein the first connector is configured to carry first input data on the first differential pair of lines and to carry first output data on the second differential pair of lines;*

*a second connector including fifth, sixth, seventh and eighth differential pairs of lines, wherein the second connector is configured to carry second input data on the fifth differential pair of lines and to carry second output data on the sixth differential pair of lines;*

*a plurality of low-capacitance electric pulse suppression devices coupled between ground and the lines of the first, second, third, fourth, fifth, sixth, seventh and eighth differential pairs;*

*a first pulse shaping and repeating circuit;*

*a second pulse shaping and repeating circuit;*

*a first set of isolation transformers coupled between said first pulse shaping and repeating circuit and said first and second differential pairs, wherein said first set of isolation transformers is configured to maintain magnetizing inductance at elevated temperatures;*

*a second set of isolation transformers coupled between said second pulse shaping and repeating circuit and said fifth and sixth differential pairs, wherein said second set of isolation transformers is configured to maintain magnetizing inductance at elevated temperatures;*

*a programmable logic device coupling between the first pulse shaping and repeating circuit and the second pulse shaping and repeating circuit, wherein the programmable logic device is configured to (a) receive the first input data from the first pulse shaping and repeating circuit and to forward the first input data as the second output data to the second pulse shaping and repeating circuit and (b) receive the second input data from the second pulse shaping and repeating circuit and forward the second input data as the first output data to the first pulse shaping and repeating circuit;*

*first circuitry configured to convey power from the third and fourth differential pairs to the seventh and eighth differential pairs, wherein the first circuitry includes:*

*a first circuit path coupled between the third differential pair and the eighth differential pair;*

*a second circuit path coupled between the fourth differential pair and the seventh differential pair;*

*a plurality of electromagnetic chokes in the first circuit path and the second circuit path; and*

*a transient voltage protection device coupled between the first circuit path and the second circuit path;*

*a power supply configured to generate a supply voltage for said apparatus based upon a potential difference between said first circuit path and said second circuit path.*

*36. The apparatus of claim 35, wherein the third, fourth, seventh and eighth differential pairs are not used for transfer data.*

*37. The apparatus of claim 35,*

*wherein the first connector is further configured to carry third input data on said third differential pair of lines and to carry third output data on said fourth differential pair of lines;*

*wherein the second connector is further configured to carry fourth input data on said seventh differential pair of lines and to carry fourth output data on said eighth differential pair of lines;*

*wherein the first set of isolation transformers is also coupled to said third and fourth differential pairs;*

*wherein the second set of isolation transformers is also coupled to said seventh and eighth differential pairs; and*

*wherein the programmable logic device is further configured to (c) receive the third input data from the first pulse shaping and repeating circuit and to forward the third input data as the fourth output data to the second pulse shaping and repeating circuit and (d) receive the fourth input data from the second pulse shaping and repeating circuit and forward the fourth input data as the third output data to the first pulse shaping and repeating circuit.*

*38. The apparatus of claim 35, further comprising a microcontroller coupled to first pulse shaping and repeating circuit and the second pulse shaping and repeating circuit, wherein the microcontroller is configured for controlling rate and mode negotiation.*

*39. The apparatus of claim 35 further comprising a bidirectional transient voltage suppressor coupled between the second circuit path and said ground.*

*40. The apparatus of claim 35, wherein the first circuit path is coupled to a common mode voltage of the third differential pair and a common mode voltage of the eighth differential pair, wherein the second circuit path is coupled to a common mode voltage of the fourth differential pair and a common mode voltage of the seventh differential pair.*

* * * * *